United States Patent
Mandou et al.

(10) Patent No.: US 7,603,924 B2
(45) Date of Patent: Oct. 20, 2009

(54) CONTROL DEVICE FOR AUTOMATIC TRANSMISSION

(75) Inventors: Kiyohiro Mandou, Saitama (JP); Yoshinori Furusawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 11/712,427

(22) Filed: Mar. 1, 2007

(65) Prior Publication Data
US 2007/0204710 A1   Sep. 6, 2007

(30) Foreign Application Priority Data
Mar. 1, 2006   (JP) .................. P. 2006-054715

(51) Int. Cl.
*F16H 59/00* (2006.01)
(52) U.S. Cl. ........................................ 74/335
(58) Field of Classification Search ............... None
See application file for complete search history.

(56) References Cited

U.S. PATENT DOCUMENTS

| 4,425,620 | A | | 1/1984 | Batcheller et al. |
| 5,819,585 | A | * | 10/1998 | Darnell ............... 74/335 |
| 6,363,805 | B1 | | 4/2002 | Marchart |
| 6,401,564 | B1 | * | 6/2002 | Lee .................. 74/473.18 |
| 7,028,575 | B2 | * | 4/2006 | Ehrmaier et al. ...... 74/473.18 |
| 7,530,285 | B2 | * | 5/2009 | Rettenmaier et al. ... 74/473.18 |

FOREIGN PATENT DOCUMENTS

| DE | 195 47 750 A1 | 6/1997 |
| DE | 199 12 963 B4 | 5/2005 |
| EP | 0 895 003 A1 | 2/1999 |
| EP | 0 780 600 B1 | 3/2000 |
| GB | 2 353 337 A | 2/2001 |
| JP | 10-054454 A | 2/1998 |
| JP | 10-141489 A | 5/1998 |
| JP | 11-141663 A | 5/1999 |
| JP | 2000-224713 A | 8/2000 |
| JP | 2000-283281 A | 10/2000 |
| JP | 2002-362180 A | 12/2002 |

* cited by examiner

*Primary Examiner*—Dirk Wright
(74) *Attorney, Agent, or Firm*—Arent Fox LLP (57) ABSTRACT

A control device 5 for an automatic transmission apparatus 2 has an automatic gearshift mode in which the gear of the automatic transmission 2 is automatically controlled by setting the shift position of a shift device 3 in one of forward travel positions including a first and a second forward position. The control device 5 also has a manual gearshift mode changing the gear one step by one step by an operating unit 4 other than the shift device 3 while maintaining the shift position set in the forward position 33. The manual gearshift mode includes a first manual mode when the shift position of the shift device 3 is set in a first forward position, and a second manual mode when the shift position is set in a second forward position. A control pattern of the first manual mode differs from that in the second manual mode.

3 Claims, 7 Drawing Sheets

CONTROL DEVICE FOR AUTOMATIC TRANSMISSION

BACKGROUND OF THE INVENTION

1. Field of the Invention

The present invention relates to a control device for an automatic transmission having an automatic gearshift mode and a manual gearshift mode.

2. Description of Related Art

Figure 6:
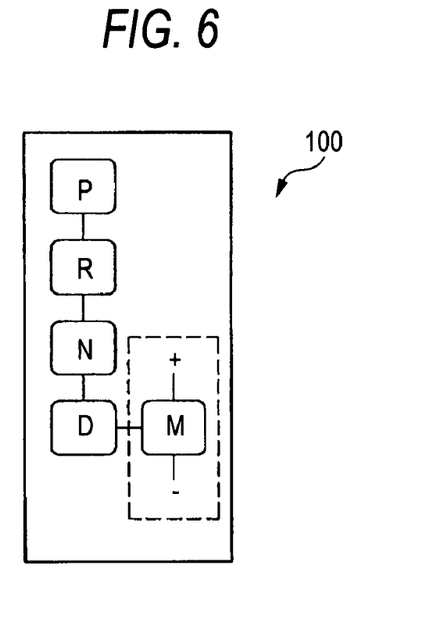
FIG. 6 is an explanatory view illustrating the shift configuration of a conventional automatic transmission apparatus having a manual gearshift mode.
Figure 7:
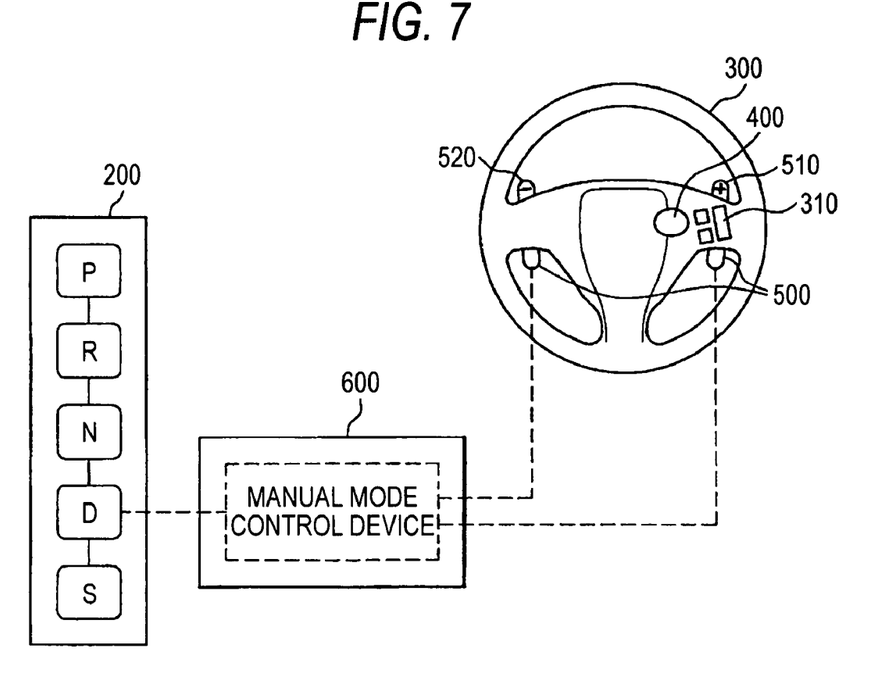
FIG. 7 is an explanatory view illustrating the shift configuration of a conventional automatic transmission apparatus in which a change over switch for changing over between an automatic gearshift mode and a manual gearshift mode is provided on a steering wheel.
Figure 8:
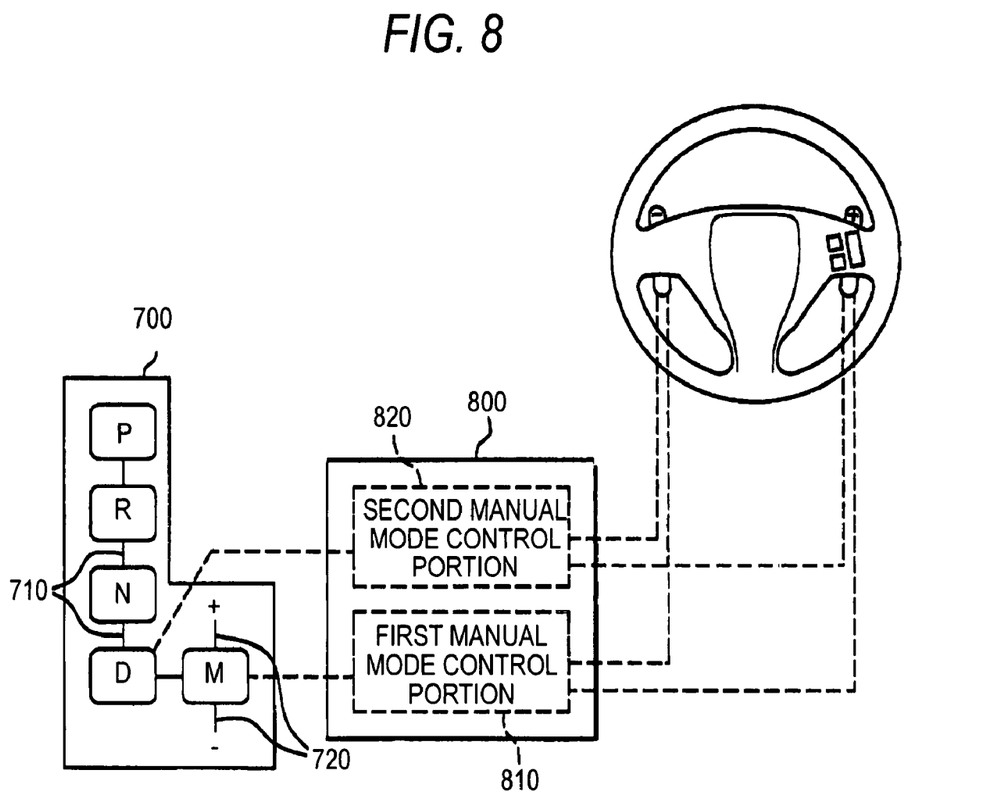
FIG. 8 is an explanatory view illustrating the shift configuration of a conventional automatic transmission apparatus having two kinds of manual gearshift modes.

FIG. 6 is an explanatory view illustrating the shift configuration of a known automatic transmission apparatus having a manual gearshift mode. FIG. 7 is an explanatory view illustrating the shift configuration of a known automatic transmission apparatus in which a change over switch for changing over between an automatic gearshift mode and a manual gearshift mode is provided on a steering wheel. FIG. 8 is an explanatory view illustrating the shift configuration of a known automatic transmission apparatus having two kinds of manual gearshift modes.

Generally, there are known three kinds of automatic transmission apparatuses respectively having manual gearshift modes, as shown in FIGS. 6 to 8.

A shift device 100 of the type shown in FIG. 6 has a manual mode position (M) for manually operating a manual mode position (M) (see, for example, JP-A-2002-362180).

The shift device 100 is used to perform a gearshift operation to shift up and down one or more gears of the automatic transmission apparatus by operating the shift lever anteroposteriorly from the manual mode position. The operating path of the shift device 100 is of what is called the H-type, and is configured so that the shift lever operated to a drive position (D) can be operated to the manual mode position.

A shift device 200 of the type shown in FIG. 7 itself does not have a manual mode position for a manual operation thereof. A gearshift operation is performed using a changeover switch 400 and a paddle switch 500, which are disposed on a steering wheel 300 (see, for example, JP-A-2000-283281). The changeover switch 400 is constituted by a switch which is used to change a gearshift mode of an automatic transmission to one of an automatic gearshift mode and a manual gearshift mode, and which is installed at a spoke portion 310 provided on the front side of the steering wheel 300. The changeover switch 400 consists of a shiftup switch 510, which is used to shift up the gear, and a shiftdown switch 520 which is used to shift down the gear. In this case, a control device 600 has one manual mode control portion configured to control the manual gearshift mode.

A shift device 700 shown in FIG. 8 has shift patterns respectively corresponding to an automatic-mode operating path 710 and a manual-mode operating path 720. Thus, in the drive position, the shift device 700 can performs an operation of changing the gearshift mode to a first manual mode. Also, in the manual mode position, the shift device 700 can performs an operation of changing the gearshift mode to a second manual mode. The shift device 700 is electrically connected to a control device 800 consisting of a first manual mode control portion 810 and a second manual mode control portion 820 differing from the first manual mode control portion 810 in the gearshift operation.

However, when an operation of changing the gear between an automatic gearshift mode and a manual gearshift mode is performed in the shift device 100 shown in FIG. 6, an operator should take his hands off the steering wheel when performing an operation of changing over between the automatic gearshift mode and the manual gearshift mode, and also should operate the shift lever from the drive position to the manual mode position. Thus, the shift device 100 has a problem in that operability is low.

The shift device 200 shown in FIG. 7 needs the changeover switch 400 configured to change over between the automatic gearshift mode and the manual gearshift mode. Thus, the shift device 200 has a problem in that the configuration of the steering wheel 300 having the changeover switch 400 is complicated.

The shift device 700 shown in FIG. 8 needs to have the manual-mode operating path 720 exclusively for a manual gearshift operation, and to have the manual mode position (M) Thus, the shift device 700 has a problem in that the configuration of the shift device 700 is complicated.

SUMMARY OF THE INVENTION

Accordingly, an object of the invention is to provide a control device for an automatic transmission, which is enabled to perform operations in different manual gear shift modes while maintaining the shift position of a shift device at one of forward travel positions including a first forward position and a second forward position.

To solve the foregoing problems, according to the first aspect of the invention, there is provided a control device for an automatic transmission comprising:

an automatic transmission;

a shift device comprising a forward travel position including:

a first forward position; and a second forward position; and an operation unit which is other than the shift device, wherein the control device performs:

an automatic gearshift mode which automatically controls a gear of the automatic transmission, when a shift position is set in one of the first forward position and the second forward position; and a manual gearshift mode which change the gear one step by one step by the operation unit while maintaining the shift position of the shift device set in one of the first forward position and the second forward position, wherein the manual gearshift mode comprises:

a first manual mode which is performed when the shift position of the shift device is set in the first forward position; and a second manual mode which is performed when the shift position of the shift device is set in a second forward position, and wherein a control pattern of the first manual mode differs from that of the second manual mode.

Incidentally, the first forward position and the second forward position are the optional shift positions of the shift device, in each of which a vehicle moves forward. The first forward position and the second forward position are, for example, a drive-position, a low-position, a D2-position, and a D3-position.

According to the first aspect of the invention, there are two manual gearshift modes that are a first manual mode, in which the shift position of the shift device is set in the first forward position, and a second manual mode in which the shift position of the shift device is set in the second forward position. Consequently, the control device for the automatic transmission can appropriately select one of 2 kinds of the manual gearshift modes according to the running condition of a vehicle, a road condition, and a driver's preference. Thus, running causing a driver to have a manual shift feeling can be achieved.

Thus, even when, for example, a shift device having no shift patterns of a manual operating path (a manual shift sequence) is mounted on a vehicle, and where the shift device capable of setting the shift positions in the forward positions including the first forward position and the second forward position is mounted in the vehicle, the first control device can be additionally installed later in the vehicle.

Note that in the present invention, when the shift position is set in the first or second forward position, the control device for the automatic transmission can perform both of the automatic gearshift mode and the manual gearshift mode. Therefore, in order to perform the manual gearshift mode, there is not necessary to provide any positions to perform only manual mode on the shift device.

Further, in the present invention, any special switch for switching between the manual gearshift mode and the automatic gearshift mode. According to the present invention, by employing the operation unit which can switch the automatic/manual gearshift mode while maintaining the shift position of the shift device in the first or second forward position, the control device directly switches the automatic gearshift mode into the manual gearshift mode without any switches.

According to a second aspect of the invention, as set forth in the first aspect of the invention, it is preferable that the first manual mode is changed to the automatic gearshift mode when no operations are performed by the operating unit for a predetermined time.

According to the second aspect of the invention, the shift device is operated to set the control device in the first manual mode. Thus, for example, when a vehicle starts, the vehicle can be adapted to temporarily run by putting a high priority on acceleration. Alternatively, the vehicle can be adapted to run by causing an engine brake to effectively act. Then, after a predetermined time elapses since the control device is set in the first manual mode, the automatic transmission is put back into an initial automatic gearshift mode in the drive range.

According to a third aspect of the invention, as set forth in the second aspect of the invention, it is preferable that the operating unit comprises:

a common shiftup switch configured to shift up the gear in the first manual mode and in the second manual mode; and a common shiftdown switch configured to shift down the gear in the first manual mode and in the second manual mode.

According to the third aspect of the invention, because the operating unit has a common shiftup switch configured to shift up the gear in the first manual mode and in the second manual mode, and also has a common shiftdown switch configured to shift down the gear, the number of switches can be reduced.

According to the first aspect of the invention, a control device for an automatic transmission enables a vehicle to perform operations in the different manual modes, respectively, in two or more forward positions including the first forward position and the second forward position. The control device for the automatic transmission is convenient, because the control device for the automatic transmission can appropriately select one of 2 kinds of the manual gearshift modes according to the running condition of a vehicle, a road condition, and a driver's preference, so that manual shift running can be achieved.

According to the second aspect of the invention, in a case where no operations are performed by the operating unit for a predetermined time in the first manual mode, the gearshift mode is automatically changed to the initial automatic mode. Thus, the vehicle can temporarily run by putting a high priority on acceleration. Alternatively, the vehicle can run by causing an engine brake to effectively act.

According to the third aspect of the invention, the operating unit has the common shiftup switch configured to shift up the gear in the first manual mode and in the second manual mode, and the common shiftdown switch configured to shift down the gear in the first manual mode and in the second manual mode. Thus, the number of switches can be reduced. Also, the configuration of the system including the operating unit and the steering wheel can be prevented from being complicated. Thus, the configuration of the system can be simplified.

Additionally, in a case where an operation of changing over between the automatic gearshift mode and the manual gearshift mode is performed, an operator can achieve this operation by operating the operating unit in a state in which he takes the steering wheel. Consequently, the operability is high.

DETAILED DESCRIPTION OF EXEMPLARY EMBODIMENTS OF THE INVENTION EMBODIMENTS

Hereinafter, an example of a control device for an automatic transmission according to an embodiment of the invention is described with reference to FIGS. 1 to 4.

Figure 1:
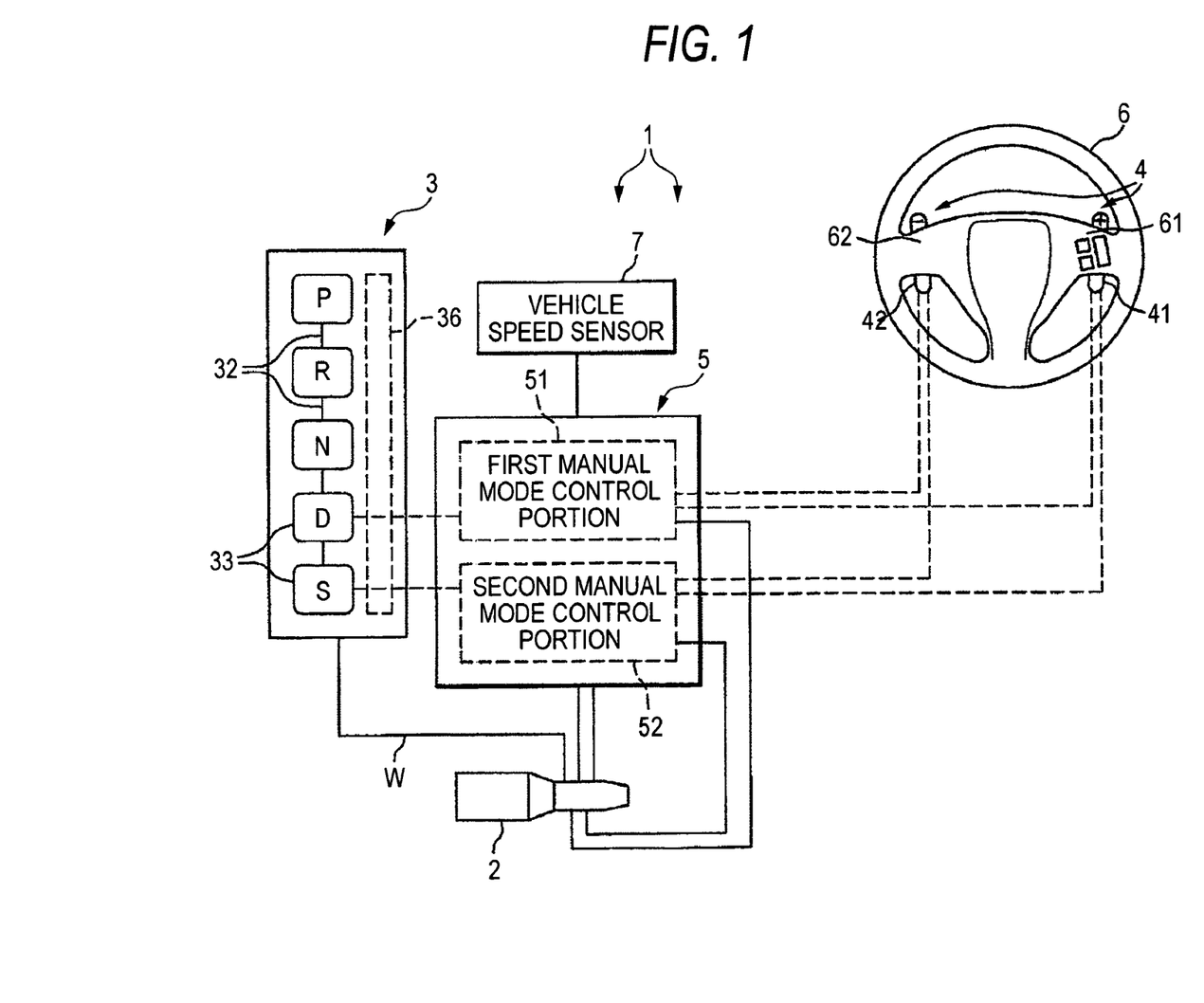
FIG. 1 is a perspective view illustrating a control device for an automatic transmission, according to an embodiment of the invention.
Figure 2:
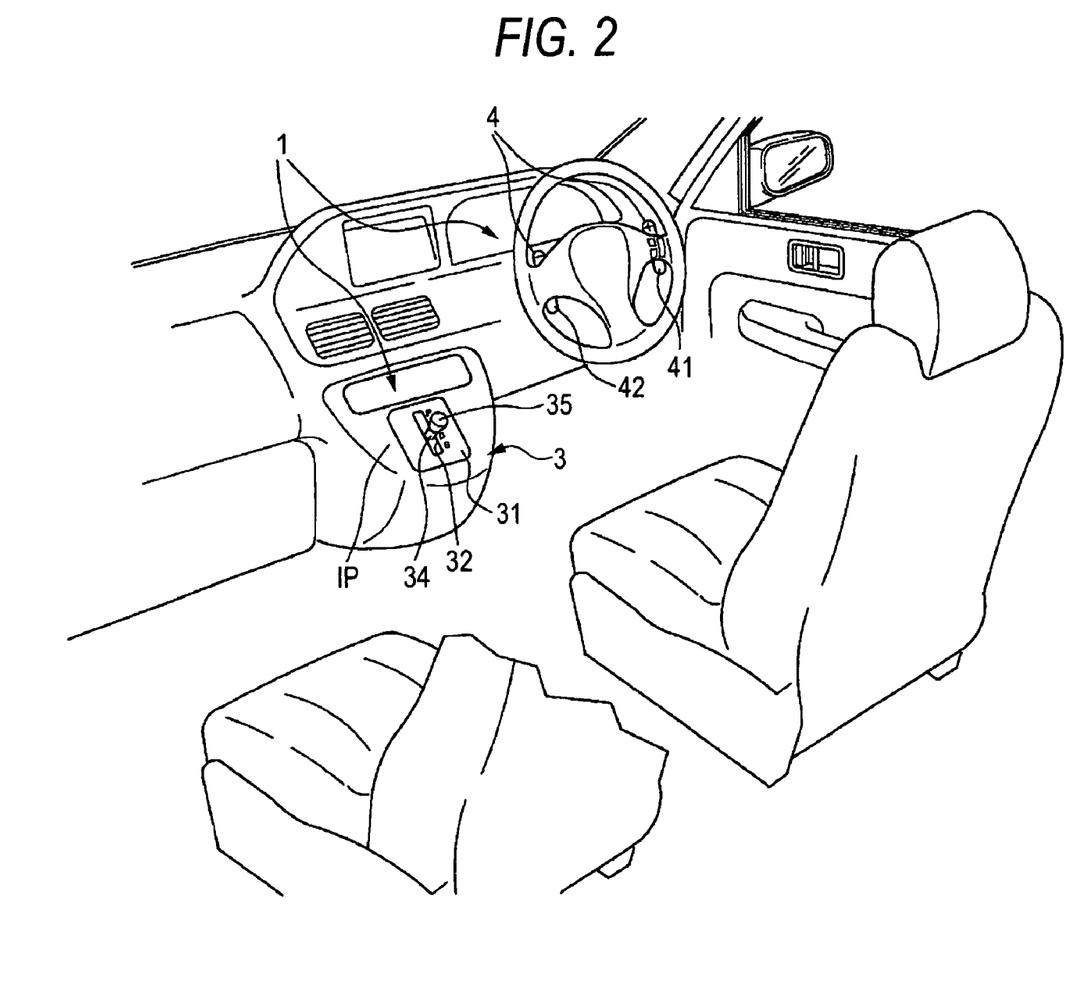
FIG. 2 is a block view illustrating the control device for the automatic transmission, according to the embodiment of the invention.

FIG. 1 is a block view illustrating the control device for the automatic transmission, according to the embodiment of the invention. FIG. 2 is a perspective view illustrating the control device for the automatic transmission, according to the embodiment of the invention.

First, before describing the control device 5 for the automatic transmission 2 according to the embodiment of the invention, the automatic transmission 2 and an automatic transmission system 1 in a vehicle, on which the control device 5 is mounted, are described below.

Configuration of Automatic Transmission System

As shown in FIG. 1, the automatic transmission system 1 has an automatic gearshift mode in which the control device 5 for the automatic transmission 2 automatically controls the gear of the automatic transmission 2 by setting the shift position of a shift device 3 at one of forward travel positions 33 including a drive position (a first forward position) and a sport mode (a second forward position). The control device 5 also has a manual gearshift mode in which the gear can be changed one step by one step by an operating unit 4 other than the shift device 3 while maintaining the shift position of the shift device 3 set in the forward position 33.

The automatic transmission system 1 includes a shift device 3 having the two forward travel positions 33. The automatic transmission system 1 also includes the operating unit 4 configured to change, when operated while the shift position of the shift device 3 is set in the forward travel position 33, the automatic gearshift mode to the manual gearshift mode, and also configured to shift up and down the gear of the automatic transmission 2. The automatic transmission system 1 also includes the control device 5 configured to control the automatic transmission 2 according to signals (a shift selection signal and a switch operating signal) sent from the shift device 3 and the operating unit 4, the automatic transmission 2, and a vehicle speed sensor 7 configured to detect a vehicle speed.

The automatic transmission system 1 includes the control device 5 having at least a first manual mode control portion 51 configured to control the automatic transmission 2 by changing the shift position to the first manual mode according to a range selection signal, which is received from when the drive position is selected by the shift device 3, and according to a switch operating signal received from the operating unit 4, and also having a second manual mode control portion 52 configured to control the automatic transmission 2 by changing the shift position to the second manual mode according to a shift selection signal, which is received from when the sport mode position is selected by the shift device 3, and according to a switch operating signal received from the operating unit 4.

Incidentally, the drive position corresponds to the "first forward position" described in the claims. The sport mode position corresponds to the "second forward position" described in the claims. The control device 5 corresponds to the "control device for a automatic transmission" described in the claims. Hereinafter, a case, in which the first forward position is set in the drive position, and in which the second forward position is set in the sport mode position, is described below by way of example.

Configuration of Automatic Transmission

The automatic transmission 2 shown in FIG. 1 is configured to automatically perform operations on a clutch and a transmission. The automatic transmission 2 has, for example, a parking range P corresponding to a parking position of the shift device 3, a reverse range R corresponding to a reverse position of the shift device 3, a neutral range N corresponding to a neutral position of the shift device 3, a drive range D corresponding to the drive position of the shift device 3, a sport mode range S corresponding to the sport mode position of the shift device 3, the first manual mode corresponding to a case, in which the operating unit 4 is operated when the shift position of the shift device 3 is set in the drive position, and the second manual mode corresponding to a case, in which the operating unit 4 is operated when the shift position of the shift device 3 is set in the sport mode position. The automatic transmission 2 is operated by allowing an operator to operate a shift lever 34 (see FIG. 2) of the shift device 3 or by the operating unit 4 other than the shift device 3. The automatic transmission 2 is electrically connected to the control device 5 and is controlled by the control device 5.

The sport mode range S of the automatic transmission 2 is a range suitable for running by putting a high priority on acceleration. The first manual mode is a range suitable for using an engine brake on, for example, a decline. The second manual mode is a range in which a driver can have a stronger manual shift feeling during the running of the vehicle, as compared in the first manual mode.

Configuration of Shift Device

As shown in FIG. 2, the shift device is a manual operating device used to change the range set in the automatic transmission 2 (see FIG. 1) with the shift lever 34. The shift device 3 selects one of five shift positions (the parking position, the reverse position, the neutral position, the drive position, and the sport mode position). The shift device 3 is mounted on an instrument panel IP between a driver seat and a front passenger seat so that the shift lever 34 is projected therefrom. The shift device 3 has the shift leer 34 installed movably to a plurality of shift positions, an escutcheon cover 31 configured to guide an operating direction of the shift lever 34, a detent mechanism (not shown) configured to hold the shift lever 34 at each of the shift positions, and a shift position switch 36 (see FIG. 1) configured to detect the position of the shift lever 34.

The shift position switch 36 shown in FIG. 1 is a detection switch configured to detect the shift position that is selected and operated by the shift lever 34 (see FIG. 2). Each of the shift positions can be detected by the shift position switch 36. The shift position switch 36 includes a moving contact adapted to move together with the shift lever 34, and fixed contacts respectively corresponding to the shift positions, at each of which the corresponding fixed contact is in contact with the moving contact when the shift lever 34 is operated thereto, thereby to turn on the switch 36.

A shift selection signal corresponding to each of the shift positions is outputted from the shift position switch 36 to the control device 5.

Configuration of Shift Lever

The shift lever 34 shown in FIG. 2 are passed through a groove-like operating path 32 that is formed in the escutcheon cover 31 attached to the instrument panel IP. The shift lever 34 is operated to each of the shift positions by being, for example, swing-operated anteroposteriorly along the operating path 32. The shift lever 34 has a shift knob 35. A wire W adapted to transmit the operating movement of the shift lever 34 to the automatic transmission 2 is connected to a base portion of the shift lever 34.

Configuration of Escutcheon Cover

The escutcheon cover 31 (see FIG. 2) is a plate-like member used to form the operating path 32 constituting the shift pattern (or shift configuration) of the shift lever 34. The escutcheon cover 31 also serves as name plates representing the shift positions of the shift device 3.

As shown in FIG. 1, the operating path 32 is a groove regulating and guiding the operating direction of the shift lever 34 that is shift-operated by a driver and swings. The operating path 32 is constituted by, for example, a linear groove extending along an anteroposterior direction of the vehicle. The parking position corresponding to the parking range P is positioned at a front end of the operating path 32. A reverse position corresponding to the reverse range R is positioned at the near side of the parking position. The neutral position corresponding to the neutral range N is positioned at a central part at the near side of the reverse position. The drive position corresponding to the drive range D is positioned at the near side of the neutral position. The sport mode position corresponding to the sport mode range S is positioned at the rear end portion.

For example, characters "P" representing the parking range set in the automatic transmission 2, character "R" representing the reverse range, character "N" representing the neutral range, character "D" representing the drive range, and character "S" representing the sport mode range are additionally printed on the side of the operating path 32 formed in the escutcheon cover 31 (see FIG. 2).

Incidentally, the shift device 3 shown in FIG. 2 has two forward positions 33 including, for example, the drive position and the sport mode position in the automatic gearshift mode. The control device 5 can change the shift position of the automatic transmission 2 from the drive range D in the automatic gearshift mode to the first manual mode by operating the operating unit 4 in a case where the shift position of the shift lever 34 is set to the drive position. The control device 5 can change the shift position of the automatic transmission 2 from the sport mode range S in the automatic gearshift mode to the second manual mode by operating the operating unit 4 in a case where the shift position of the shift lever 34 is set to the sport mode position.

Configuration of Operating Unit

The operating unit 4 shown in FIG. 1 is a switch that is adapted to change the automatic gearshift mode to the manual gearshift modes (the first manual mode and the second manual mode) and that is also adapted to manually shift up and down the gear of the automatic transmission 2 in the manual gearshift mode. Thus, the operation means 4 has a shiftup switch 41 and a shiftdown switch 42. When the shiftup switch 41 or the shiftdown switch 42 is operated, a switch operating signal is output to the control device 5. Additionally, the detailed functions of the operating unit 4 are described later.

Incidentally, each of the operating unit 4 (the shiftup switch 41 and the shiftdown switch 42) is what is called a paddle switch or an up-down switch, and is provided at a corresponding one of a left spoke portion 61 and a right spoke portion 62 of the steering wheel 6. The operating unit 4 is installed at the rear side of each of the spoke portions 61 and 62 at which a driver's fingers, such as a middle finger and an annular finger can reach in a state in which the driver grips the steering wheel 6.

The operating unit 4 shown in FIG. 1 includes the shiftup switch 41, which is used to shift up the gear of the automatic gear 2, and the shiftdown switch 42 which is used to shift down the gear of the automatic gear 2. The shiftup switch 41 is installed, for example, at the right-side spoke portion 61 of the steering wheel 6 in a straight advancement, as viewed in FIG. 1. The shiftdown switch 42 is installed, for example, at the left-side spoke portion 62 of the steering wheel 6 in a straight advancement, as viewed in FIG. 1.

Configuration of Control Device

The control device 5 controls each of the ranges of the automatic transmission and each of the first manual mode and the second manual mode. The control device 5 is electrically connected to the automatic transmission 2 and to the vehicle speed sensor 7. The control device 5 includes, for example, an ECU (Electronic Control Unit). The control device 5 according to the present embodiment has the first manual mode control portion 51 and the second manual mode control portion 52 as unique constituents.

Configuration of First Manual Mode Control Portion

The first manual mode control portion 51 shown in FIG. 1 receives a switch operating signal from the operating unit 4 and operates when the shift position of the shift device 3 (the shift lever 34 (see FIG. 2)) is set to the drive position.

The first manual mode control portion 51 sets a first gear in the manual gearshift mode by operating the shiftup switch 41 (or the shiftdown switch 42) so as to prevent a second gear start (or a higher gear start, such as a third gear start), excepting a parked state (a vehicle speed signal from the vehicle speed sensor 7 indicates "0 km/h").

Also, in a case where the shift position of the shift lever 34 is set in the drive position at a low speed (the vehicle speed is "5 km/h"), that is, in a case where the automatic transmission 2 is in the drive range (automatic gearshift mode) D, when the shiftup switch 41 is operated, the first manual mode control portion 51 operates and sets the automatic transmission 2 into the first manual mode. Then, the first manual mode control portion 51 shifts up the current gear of the automatic transmission 2 by one step to a second gear. Subsequently, the shiftup switch 41 is repeatedly operated. The gear of the automatic transmission 2 is controlled in a manual gearshift manner to be serially changed from a third gear, a fourth gear, a fifth gear, and a sixth gear at the subsequent operations, respectively.

Also, in a case where the shift position of the shift lever 34 is set in the drive position at a high speed (the vehicle speed is "100 km/h"), that is, in a case where the automatic transmission 2 is in the drive range (automatic gearshift mode) D, when the shiftdown switch 42 is operated, the first manual mode control portion 51 operates and sets the automatic transmission 2 into the first manual mode. Then, the first manual mode control portion 51 shifts up the current gear of the automatic transmission 2 by one step to a fifth gear. Subsequently, the shiftup switch 41 is repeatedly operated. The gear of the automatic transmission 2 is controlled in a manual gearshift manner to be serially changed from a fourth gear, a third gear, a second gear, and a first gear at the subsequent operations, respectively.

Thus, in a case where the operating unit 4 is operated during the vehicle runs in the drive range D, the first manual mode control portion 51 changes the current gear by one step and subsequently performs a shiftup or shiftdown control operation.

The first manual mode control portion 51 incorporates a timer circuit. In a case where the operating unit 4 is not operated within a predetermined time (for example, 15 seconds) since the operating unit 4 is operated, the first manual mode is automatically changed to the automatic gearshift mode in the original drive range D.

Also, even when the shift lever 34 is operated from the drive position to another shift position, such as the sport mode position and the neutral position, the mode is changed from the first manual mode to the range selected by the shift lever 34.

Configuration of Second Manual Mode Control Portion

The second manual control portion shown in FIG. 1 operates by receiving a switch operating signal from the operating unit 4 and a vehicle speed signal from the vehicle speed sensor 7 when the shift position of the shift device 3 (the shift lever 34 (see FIG. 2)) is set at the sport mode position. The second manual mode control portion 52 differs in control pattern from the first manual mode control portion 51 to perform a more manual control operation, as compared with the operation of controlling the automatic transmission 2, which is performed by the first manual mode control portion 51.

Although the details of the second manual mode control portion 52 are described later, the second manual mode control portion 52 is held in the manual gear shift mode when the operating unit 4 is operated. As long as the shift lever 34 is not operated to the shift position other than the sport mode position, the second manual mode is not changed to another gearshift mode. Incidentally, the second manual mode control portion 52 may be changed from the second manual mode to the sport mode when a vehicle speed signal from the vehicle speed sensor 7 indicates 0.

Operation of Control Device for Automatic Transmission

Next, an operation of the control device 5 for the automatic transmission 2 is described with reference to FIGS. 1 to 4.

Figure 3:
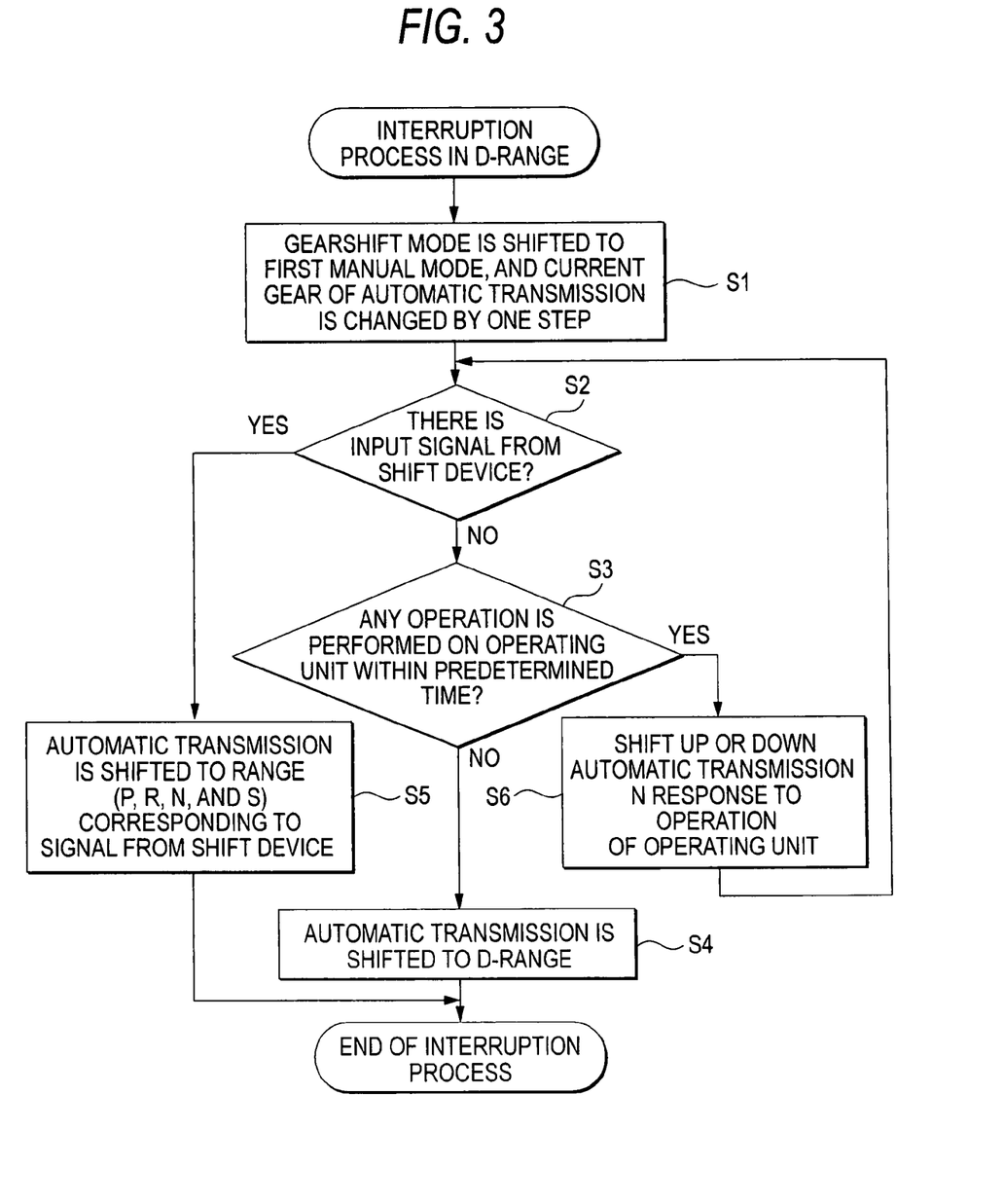
FIG. 3 is a view illustrating an operation of the control device for the automatic transmission according to the embodiment of the invention, which is a flowchart illustrating an operation in a first manual mode.
Figure 4:
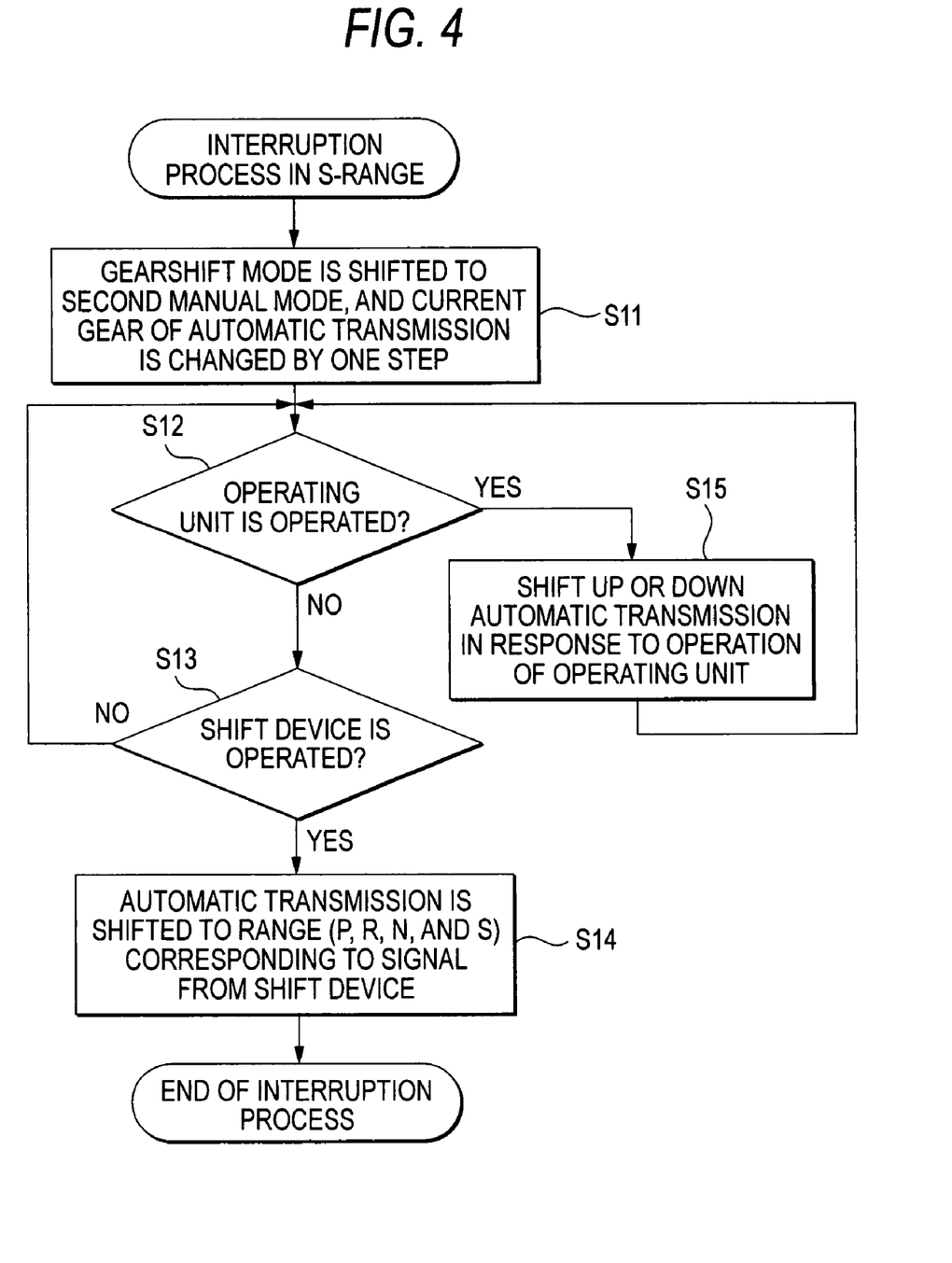
FIG. 4 is a view illustrating an operation of the control device for the automatic transmission according to the embodiment of the invention, which is a flowchart illustrating an operation in a second manual mode.

FIG. 3 is a view illustrating an operation of the control device for the automatic transmission according to the embodiment of the invention, which is a flowchart illustrating an operation in the first manual mode. FIG. 4 is a view illustrating an operation of the control device for the automatic transmission according to the embodiment of the invention, which is a flowchart illustrating an operation in the second manual mode.

When the shift lever 34 selects the forward position 33 corresponding to the drive position or the sport mode position, the gear shift mode of the automatic transmission 2 can be changed to the manual gearshift mode (the first manual mode or the second manual mode) in response to the operation of the operating unit 4. Meanwhile, in a case where the shift position of the shift lever 34 is neither the drive position nor the sport mode position, the gearshift mode of the automatic transmission 2 cannot be changed to the manual gearshift mode even when the operating unit 4 is operated.

Under such a situation, the control device 5 the control device 5 determines in which of the drive position, the sport mode position, and the other shift modes the shift position of the shift device 3 (the shift lever 34) is set.

For example, when the operating unit 4 is operated in the drive range (or drive position) D, or in the sport mode range (the sport mode position) S, a process shown in FIG. 3 is performed in a case where the operating unit 4 is operated in the drive range (or drive position) D. In a case where the operating unit 4 is operated in the sport mode range (the sport mode position) S, a process shown in FIG. 4 is performed.

Operation in Drive Range (First Manual Mode)

Next, an operation of the control device 5 in the drive range (corresponding to the drive position) D is described below with reference to FIGS. 1, 2, and 3.

For example, in a case where a driver operates the shift lever 34 (see FIG. 2) to the drive position, a shift selection signal is sent from the drive position contact of the position switch 36 shown in FIG. 1 to the control device 5.

When the operating unit 4, which is one of the shiftup switch 41 and the shiftdown switch 42, is operated in this state, the first manual mode control portion 51 operates to perform the interruption process. The first manual mode control portion 51 shifts the gearshift mode of the automatic transmission 2 to the first manual mode. At that time, the first manual mode control portion 51 changes the current gear of the automatic transmission 2 by one step in step S1.

For example, in a case where the vehicle speed is 0 km/h in the drive range (corresponding to the drive position) D, the gearshift mode of the automatic transmission 2 is set in the first manual mode. The gear of the automatic transmission 2 is changed to a first gear corresponding to the vehicle speed, by way of exception.

In a case where the shiftup switch 41 is operated in the drive range (or the drive position) D in a state in which a first gear is used at a low speed of 5 km/h, the gearshift mode of the automatic transmission 2 is changed to the first manual mode. Also, the current gear of the automatic transmission 2 is changed from a first gear to a second gear which is higher than the current gear by one step. Incidentally, in a case where the shiftdown switch 42 is operated at such a low speed, the gear of the automatic transmission 2 is still the first gear.

Further, in a case where the shiftdown switch 42 is operated in the drive range (or the drive position) D in a state in which a sixth gear is used at a speed of 100 km/h, the gearshift mode of the automatic transmission 2 is changed to the first manual mode. Also, the current gear of the automatic transmission 2 is changed from the sixth gear to a fifth gear which is lower than the current gear by one step. Incidentally, in a case where the shiftup switch 41 is operated at such a high speed, the gear of the automatic transmission 2 is still the sixth gear.

After the first transmission is changed to the first manual mode, the control device 5 monitors in step S2 whether an input signal (the shift selection) is received from the shift position switch 36 of the shift device 3 having the shift lever 34, the shift position of which is set in the drive position.

Then, in a case where the shift position of the shift lever 34 remains in the drive position, where no input signals (no shift selection signals) are received from the shift device 3 (No in step S2), and where the operating unit 4 is not operated since the operating unit 4 is once operated, that is, where the operating unit 4 is not operated for a predetermined time (for example, 15 seconds) since the operating unit 4 is once operated (No in step S3), the first manual mode control portion 51 of the control device 5 shifts the gearshift mode of the automatic transmission 2 to the automatic gearshift mode in the original drive range D from the first manual mode in step S4. Then, the interruption is finished.

In a case where the shift lever 34 is operated to another shift position in step S2, and where an input signal (a shift selection signal) is received from the shift position switch 36 of the shift device 3, the automatic transmission 2 is shifted to the range corresponding to the shift selection signal (the parking range P, the reverse range R, the neutral range N, or the sport mode range S) in step S5.

Incidentally, in a case where the shifting position of the shift device 3 is shifted to a position other than the forward positions 33, such as the parking position, the reverse position, and the neutral position, the gearshift mode of the automatic transmission 2 is changed neither to the first manual mode nor to the second manual mode.

In a case where the shift lever 34 operated to the drive position is shifted or operated to the sport mode position, an interruption process (to be described later) in the sport mode range S can be performed.

In a case where the control device 5 is shifted into the first manual mode in step S3, where the operating unit 4, which is the shiftup switch 41 or the shiftdown switch 42, is operated again (Yes in step S3) within a predetermined time (for example, 15 seconds) since the operating unit 4 is operated, the first manual mode control portion 51 receives a switch operating signal from the shiftup switch 41 or the shiftdown switch 42 and shifts up or down the automatic transmission 2 in response to the operation in step S6. Incidentally, in a case where the total number of the gears is 6, it is assumed that a switch operating signal indicating shiftdown from the first gear and a switch operating signal indicating shiftup from the sixth gear are ignored.

Next, the process returns to step S2 again. The control device 5 monitors in step S2 whether an input signal from the shift device 3 is received. Also, the control device 5 monitors in step S3 whether the operating unit 4 is operated within the predetermined time since the shiftup switch 41 or the shiftdown switch 42 is operated. In a case where the shiftup switch 41 or the shiftdown switch 42 is operated again within the predetermined time, operations to be in steps S6, S2, and S3, respectively, are performed repeatedly.

If neither the shiftup switch 41 nor the shiftdown switch 42 is operated (No in step S3), the process advances to step S4 in which the automatic transmission 2 is shifted into the automatic gearshift mode in the drive range D.

Thus, for example, in a case where the vehicle temporarily runs by putting a high priority on acceleration, the shift position of the shift device 3 is shifted to the drive position. Also, the gearshift mode is changed to the first manual mode by operating the operating unit 4. Thus, the gear can be appropriately shifted up, so that the vehicle can be accelerated to a desired high speed. When a predetermined time has elapsed since the vehicle is accelerated to the desired high speed by performing a shiftup operation, the automatic transmission 2 is shifted back to the drive range D.

Also, in a case where an engine brake is temporarily caused to more effectively act, as compared with the engine brake in the first manual mode, the automatic transmission 2 is changed from the drive range D to the first manual mode thereby to cause the engine brake to appropriately act.

Operation in Sport Mode Range (in Second Manual Mode)

Next, an operation of the control device 5 in the sport mode range (corresponding to the sport mode position) S is described below with reference to FIGS. 1, 2, and 4.

For example, in a case where the shift lever 34 is operated to the sport mode position, a shift selection signal is sent from a sport mode position contact of the shift position switch 36 to the control device 5.

When one of the operating unit 4, that is, the shiftup switch 41 or the shiftdown switch 42 in this state, the second manual mode control portion 52 operates to perform an interruption process. At that time, in step S11, the second manual mode control portion 52 changes the current gear of the automatic transmission 2 one step. This is the same with the aforementioned operation of the first manual mode control portion 51.

After set in the second manual mode, the control device 5 monitors in step S12 whether the operating unit 4 is operated in a state in which the shift position of the shift lever 34 is set to the sport mode position. In a case where the operating unit 4 is not operated (No in step S12), the process advances to step S13 without changing the second manual mode.

If the shift lever 34 is shifted to another shift position other than the sport mode range S in the second manual mode (Yes in step S13), the control device 5 shifts the automatic transmission 2 to a range (the parking range P, the reverse range R, and the neutral range N) in step S14. Thus, the interruption process is finished.

Also, in a case where no input signals (shift selection signals) are received from the shift device 3 in a state in which the shift lever 34 remains at the sport mode position, and where the operating unit 4 is not operated (No in step S13), the second manual mode control portion 52 of the control device 5 holds a state in the second manual mode. Then, the process returns to step S12 in which the second manual mode control portion 52 continues to monitor whether the operating unit 4 is operated.

Thus, the automatic transmission 2 set in the second manual mode holds the state in the manual mode unless the shift lever 34 is not operated to another shift position.

In a case where one of the operating unit 4, that is, the shiftup switch 41 or the shiftdown switch 42 is operated again in this state, the second manual mode control portion 52 receives a switch operating signal from the operating unit 4 and shifts up or down the automatic transmission 2 in step S15.

Thus, the second manual mode is suitable for frequently performing acceleration and deceleration on a road having successive upslopes and downslopes.

Advantages of Control Device for Automatic Transmission According to Embodiment of the Invention The control device for the automatic transmission according to the embodiment of the invention has the aforementioned configuration and performs the aforementioned operation. Accordingly, the control device for the automatic transmission according to the embodiment of the invention has the following advantages.

The mode of the automatic transmission 2 is shifted from the automatic gearshift mode in the drive range D or the sport mode range S to the manual gearshift mode, a driver can operate the operating unit 4 using a middle finger and an annular finger while gripping the steering wheel 6. Thus, the operability is high.

When the gearshift mode of the automatic transmission 2 is changed from the automatic gearshift mode in the drive range D and in the sport mode range S to the manual gearshift mode, which is the first manual mode or the second manual mode, by operating the common shiftup switch 41 or the common shiftdown switch 42. Thus, the operating unit is easy to operate. The problem of complication of the configuration of the steering wheel 6 can be solved.

The gearshift mode of the shift device 3 can be changed from the automatic gearshift mode in the drive range D or in the sport mode range S to the manual gearshift mode, which is the first manual mode or the second manual mode by operating the operating unit 4 when the shifting position of the shift device 3 is set in the drive position or the sport mode position. Thus, it is unnecessary for the shift device according to the invention to dispose manual mode positions exclusively for a manual gearshift operation, which are necessary for a conventional shift device. Thus, the invention can achieve the miniaturization and the simplification of the shift device 3.

Also, according to the invention, the shift pattern is not provided with a manual gearshift operating path (see FIG. 8). Thus, a similar shift device can be applied to both of a vehicle having a manual gearshift mode and a vehicle on which a normal automatic transmission does not have a manual gearshift mode. Consequently, according to the invention, the versatility of the shift device can be enhanced.

Incidentally, the invention is not limited to the above embodiment. The invention can variously be altered or modified within the technical idea of the invention, and the alternations and modifications of the invention are also within the scope of the invention.

Modifications

Figure 5:
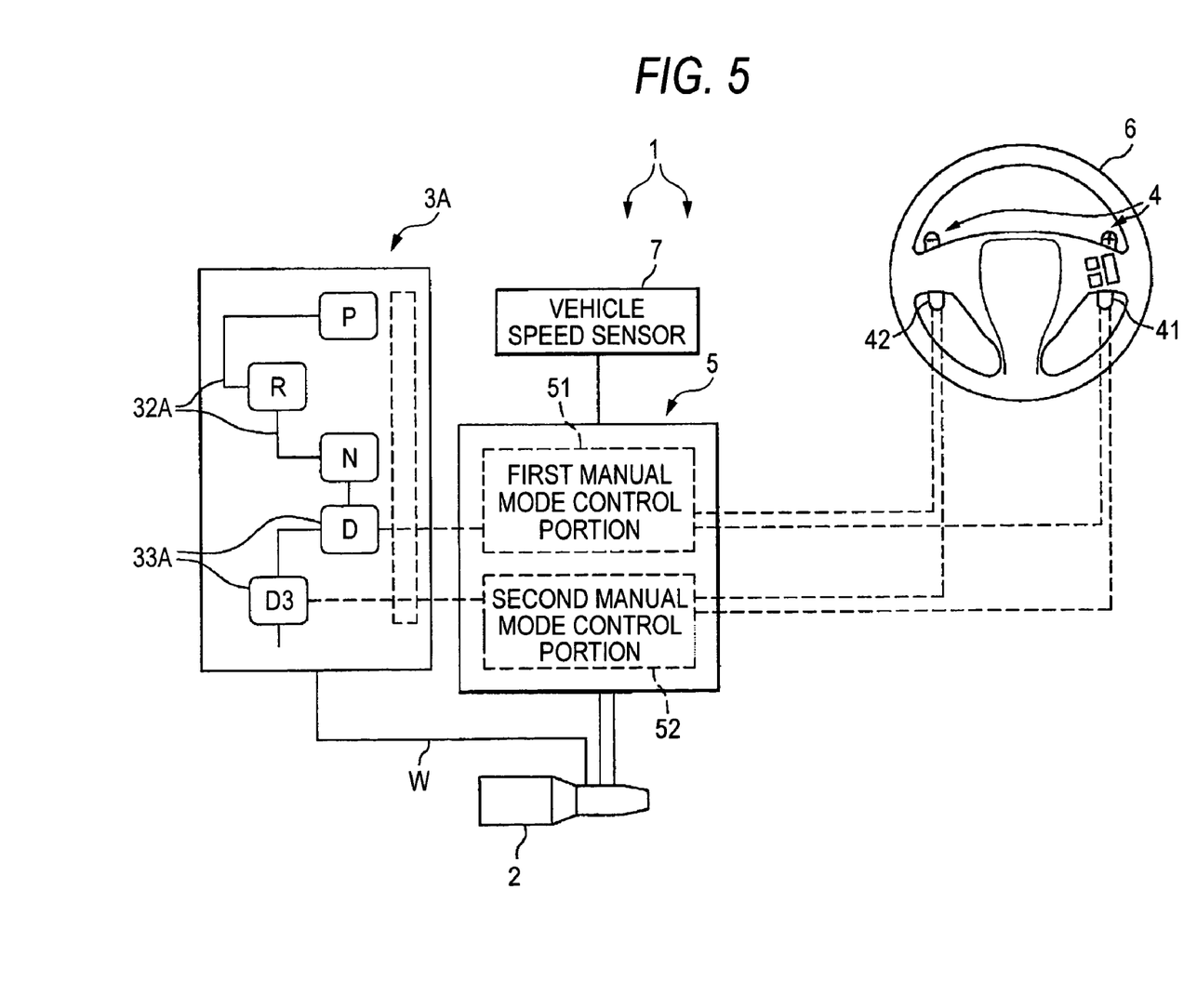
FIG. 5 is a block view illustrating a modification of the control device for the automatic transmission according to the embodiment of the invention.

FIG. 5 is a block view illustrating a modification of the control device for the automatic transmission according to the embodiment of the invention.

Although the shift device of the above embodiment shown in FIG. 2 having two forward positions 33, which are the drive position and the sport mode position, have been described as an example. The invention is not limited thereto. The control device according to the invention may be, for example, the control device having the shift device 3A shown in FIG. 5.

That is, it is sufficient that the shift device has two or more forward positions 33A, which may be, for example, a drive position, and a D3-position corresponding to an upper limit of the gear, which is a third gear. In this case, it is advisable to configure the control device so that the shift lever 34 is shifted or operated to the D3-position, and that then, the operating unit 4 is operated to set a second manual mode as the manual gearshift mode.

Additionally, the operating path 32 of the shift device 3 shown in FIG. 2 is not limited to a linearly-shaped path. For example, a gate type shift path, such as the operating-path 32A shown in FIG. 5, may be employed as the operating path of the shift path 3.

Other Modifications

The sport mode range S corresponding to the sport mode position of the shift lever 34 shown in FIG. 2 may correspond to the forward position 33 other than the shift position corresponding to the drive range D. Additionally, the D2-position and the low-position may be employed as the forward positions.

The forward positions 33 (see FIG. 1) may include two or more shift positions that include the first forward position and the second forward position.

Also, the shiftup switch 41 installed at the right-side spoke portion 61 of the steering wheel 6 shown in FIG. 2 may be a combined switch that is a single operating member enabled to perform both shiftup and shiftdown operations. In this case, the shiftup switch 41 may be constituted by, for example, an automatic recovery type seesaw switch or lever switch.

Similarly, the shiftdown switch 42 installed at the left-side spoke portion 62 of the steering wheel 6 shown in FIG. 2 may be a combined switch that is a single operating member enabled to perform both shiftup and shiftdown operations.

Additionally, the shiftup switch 41 and the shiftdown switch 42 may be differently installed at the right-side spoke portion 61 and the left-side spoke portion, respectively.

The shiftup switch 41 and the shiftdown switch 42 are not limited thereto. The shiftup switch 41 and the shiftdown switch 42 may be constituted by lever switches installed on the steering column, respectively.

Incidentally, the operating unit 4 may be installed on the front surface sides of the spoke portions 61 and 62 at positions at which a driver's finger, such as a thumb, can reach the operating unit 4 in a state in which the driver grips the steering wheel 6.

Also, the shift position switch 36 may be an inhibitor switch that is installed at the automatic transmission 2 and that detects each of the ranges of the automatic transmission 2.

Although the above embodiment employs a normal shift device 3 adapted to change the ranges by mechanically transmitting the shift operation of the shift lever 34 to the automatic transmission, the shift device according to the invention is not limited thereto. The invention can be applied to a shift device of the shift-by-wire type.

In this case, it is advisable to remove a wire W connecting the shift lever 34 (see FIG. 2) of the shift device 3 shown in FIG. 1 to the automatic transmission 2 and to control the automatic transmission 2 according to a shift selection signal obtained by detecting a shift operation of the shift lever 34 with the shift position switch 36.

In a case where such a shift device of the shift-by-wire type is employed, the shift lever 34 can easily be provided at an appropriate position on the steering column. Also, the necessity of the components, such as the wire W, and a wiring operation can be eliminated. Consequently, the number of components and the cost of a wiring operation can be reduced.

What is claimed is:

1. A control device for an automatic transmission comprising:
   an automatic transmission;
   a shift device comprising a forward travel position including:
      a first forward position; and
      a second forward position; and
   an operation unit which is other than the shift device,
   wherein the control device performs:
   an automatic gearshift mode which automatically controls a gear of the automatic transmission, when a shift position is set in one of the first forward position or the second forward position; and
   a manual gearshift mode which change the gear one step by one step by the operation unit while maintaining the shift position of the shift device set in one of the first forward position and second forward position,
   wherein the manual gearshift mode comprises:
   a first manual mode which is performed when the shift position of the shift device is set in the first forward position; and
   a second manual mode which is performed when the shift position of the shift device is set in a second forward position, and
   wherein a control pattern of the first manual mode differs from that of the second manual mode.

2. The control device for an automatic transmission according to claim 1, wherein the first manual mode is changed to the automatic gearshift mode when no operations are performed by the operating unit for a predetermined time.

3. The control device for an automatic transmission according to claim 2, wherein the operating unit comprises:
   a common shiftup switch configured to shift up the gear in the first manual mode and in the second manual mode; and
   a common shiftdown switch configured to shift down the gear in the first manual mode and in the second manual mode.

* * * * *